United States Patent
Chen et al.

(10) Patent No.: US 11,216,030 B2
(45) Date of Patent: Jan. 4, 2022

(54) PORTABLE ELECTRONIC DEVICE

(71) Applicants: Yan-Yu Chen, Taipei (TW);
Chien-Feng Chan, Taipei (TW);
Ming-Cheng Tsou, Taipei (TW);
Yu-Wen Cheng, Taipei (TW);
Chun-Wen Wang, Taipei (TW);
Wang-Hung Yeh, Taipei (TW)

(72) Inventors: Yan-Yu Chen, Taipei (TW);
Chien-Feng Chan, Taipei (TW);
Ming-Cheng Tsou, Taipei (TW);
Yu-Wen Cheng, Taipei (TW);
Chun-Wen Wang, Taipei (TW);
Wang-Hung Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/013,666

(22) Filed: Sep. 7, 2020

(65) Prior Publication Data
US 2021/0089084 A1    Mar. 25, 2021

Related U.S. Application Data

(60) Provisional application No. 62/897,399, filed on Sep. 9, 2019.

(51) Int. Cl.
*G06F 1/16*    (2006.01)

(52) U.S. Cl.
CPC .......... *G06F 1/1624* (2013.01); *G06F 1/1618* (2013.01); *G06F 1/1662* (2013.01); *G06F 1/1679* (2013.01); *G06F 1/1681* (2013.01)

(58) Field of Classification Search
CPC .... G06F 1/1624; G06F 1/1618; G06F 1/1662; G06F 1/1679; G06F 1/1681; G06F 1/162; G06F 1/1622
See application file for complete search history.

(56) References Cited

U.S. PATENT DOCUMENTS

| | | | |
|---|---|---|---|
| 7,652,873 B2 * | 1/2010 | Lee | E05B 65/006 |
| | | | 361/679.06 |
| 7,787,245 B2 | 8/2010 | Prabhune et al. | |

(Continued)

FOREIGN PATENT DOCUMENTS

| | | |
|---|---|---|
| TW | M444019 | 12/2012 |
| TW | M463964 | 10/2013 |

(Continued)

OTHER PUBLICATIONS

"Office Action of Taiwan Counterpart Application", dated Feb. 4, 2021, p1-p6.

*Primary Examiner* — Rockshana D Chowdhury
(74) *Attorney, Agent, or Firm* — JCIPRNET

(57) ABSTRACT

A portable electronic device includes a host, a sliding base, a base plate, a display and a sliding rotating element. The sliding base is disposed on the host and has at least one guiding portion and at least one sliding slot connected to the guiding portion. The base plate is disposed on the sliding base. The display is pivoted on the base plate. The sliding rotating element is fixed to the base plate and is rotatably and slidably connected to the sliding base, and the display and the base plate are configured to rotate or slide on the sliding base along with the sliding rotating element.

19 Claims, 12 Drawing Sheets

(56) References Cited

U.S. PATENT DOCUMENTS

| | | | | |
|---|---|---|---|---|
| 8,908,364 B2* | 12/2014 | Tseng | ............... | G06F 1/1681 |
| | | | | 361/679.26 |
| 9,189,015 B2* | 11/2015 | Tseng | ............... | G06F 1/1679 |
| 9,292,048 B2* | 3/2016 | Constin | ............ | G06F 1/1637 |
| 10,890,949 B2* | 1/2021 | Ou | ................. | G06F 1/1616 |
| 2011/0063785 A1* | 3/2011 | Yamagiwa | ......... | G06F 1/1624 |
| | | | | 361/679.01 |
| 2011/0156562 A1* | 6/2011 | Wu | ................. | G06F 1/1624 |
| | | | | 312/323 |
| 2012/0162879 A1* | 6/2012 | Totsuka | ............ | G06F 1/1681 |
| | | | | 361/679.01 |
| 2013/0329351 A1* | 12/2013 | Lin | ................. | G06F 1/1624 |
| | | | | 361/679.27 |
| 2014/0043746 A1* | 2/2014 | Lai | ................. | G06F 1/1669 |
| | | | | 361/679.17 |
| 2015/0055291 A1* | 2/2015 | Chuang | ............ | G06F 1/1622 |
| | | | | 361/679.55 |
| 2015/0296060 A1* | 10/2015 | Gu | ................. | G06F 1/162 |
| | | | | 455/575.4 |

FOREIGN PATENT DOCUMENTS

| | | |
|---|---|---|
| TW | I616744 | 3/2018 |
| TW | M590711 | 2/2020 |

\* cited by examiner

PORTABLE ELECTRONIC DEVICE

CROSS-REFERENCE TO RELATED APPLICATION

This application claims the priority benefit of U.S. provisional application Ser. No. 62/897,399, filed on Sep. 9, 2019. The entirety of the above-mentioned patent application is hereby incorporated by reference herein and made a part of specification.

BACKGROUND

Technical Field

The invention is related to an electronic device, and is particularly related to a portable electronic device.

Description of Related Art

Since notebook computers have excellent computing performance and are easily carried, they have become indispensable tools for modern people. Common notebook computers do not have good operational flexibility, since most of the displays of them can only rotate along one single axial direction relative to the hosts to perform unfolding and closing.

For the convenience of users in sharing images on the displays with others, other types of notebook computers are thus proposed. More specifically, the displays not only rotates relative to the hosts around a first axial direction to perform unfolding and closing, but also rotates around a second axial direction perpendicular to the first axial direction on the hosts to adjust an orientation of the screens. However, the displays cannot slide on the hosts, so it is difficult to provide more diversified operating modes.

SUMMARY

The invention provides a portable electronic device, which exhibits excellent operational flexibility.

The invention proposes a portable electronic device, which includes a host, a sliding base, a base plate, a display, and a sliding rotating element. The sliding base is disposed on the host, where has at least one guiding portion and at least one sliding slot connected to the at least one guiding portion. The base plate is disposed on the sliding base. The display is pivoted on the base plate. The sliding rotating element is fixed on the base plate, where the sliding rotating element is rotatably and slidably connected to the sliding base, and the display and the base plate are configured to rotate or slide along with the sliding rotating element on the sliding base. The sliding rotating element includes at least one positioning column. In a mode, the positioning column is positioned at the at least one guiding portion, and the display and the base plate are configured to rotate along with the sliding rotating element on the sliding base. In another mode, the positioning column slides from the at least one guiding portion into the at least one sliding slot, and the display and the base plate are configured to slide along with the sliding rotating element on the sliding base.

In an embodiment of the invention, the portable electronic device further includes a hinge located between the display and the base plate, and the display is pivotally connected to the base plate through the hinge.

In an embodiment of the invention, the guiding portion includes a middle guiding portion and a side guiding portion relative to the middle guiding portion, and the sliding slot includes a first sliding slot and a second sliding slot parallel to the first sliding slot. The first sliding slot and the second sliding slot are connected to the middle guiding portion and the side guiding portion.

In an embodiment of the invention, the positioning column includes a first positioning column and a second positioning column. In a mode, the first positioning column and the second positioning column are positioned at the middle guiding portion or the side guiding portion. In another mode, the first positioning column and the second positioning column slide from the middle guiding portion or the side guiding portion into the first sliding slot and the second sliding slot.

In an embodiment of the invention, the portable electronic device further includes a keyboard slidably disposed on the host. When the first positioning column and the second positioning column are positioned at the side guiding portion, and the sliding rotating element is rotating on the sliding base, the second positioning column propels the keyboard to slide on the host.

In an embodiment of the invention, the host has a groove, and the keyboard is slidably disposed in the groove.

In an embodiment of the invention, the side guiding portion has a first side arc sliding slot and a second side arc sliding slot. The first sliding slot is connected to the first side arc sliding slot, and the second sliding slot is connected to the second side arc sliding slot. The first positioning column is configured to slide from the first sliding slot into the first side arc sliding slot, and the second positioning column is configured to slide from the second sliding slot into the second side arc sliding slot.

In an embodiment of the invention, the keyboard includes a keyboard main body and a connecting rod, and the connecting rod has a first end and a second end. The first end is pivotally connected to the keyboard main body, and the second end is disposed corresponding to the second side arc sliding slot. The second positioning column is configured to slide from the second sliding slot into the second side arc sliding slot and be mechanically coupled to the second end, to drive the second end to slide along the second side arc sliding slot.

In an embodiment of the invention, the middle guiding portion has a first middle arc sliding slot and a second middle arc sliding slot. The first sliding slot penetrates the first middle arc sliding slot, and the second sliding slot penetrates the second middle arc sliding slot. When the first positioning column and the second positioning column are positioned at the middle guiding portion, the first positioning column is configured to slide in the first middle arc sliding slot, and the second positioning column is configured to slide in the second middle arc sliding slot.

In an embodiment of the invention, the first middle arc sliding slot has a sliding end and a restricting end relative to the sliding end, and the first sliding slot penetrates the sliding end. The first positioning column slides between the sliding end and the restricting end. When the first positioning column is positioned at the sliding end, the first positioning column is adapted to slide from the first middle arc sliding slot into the first sliding slot, and the second positioning column is adapted to slide from the second middle arc sliding slot into the second sliding slot. When the first positioning column slides to the restricting end, the first positioning column deviates from the first sliding slot and is incapable of sliding into the first sliding slot, and the second positioning column is prevented from sliding into the second sliding slot.

In an embodiment of the invention, the second middle arc sliding slot surrounds the first middle arc sliding slot.

In an embodiment of the invention, the portable electronic device further includes a sliding piece and a slide rail. The sliding piece has a sliding portion and a sleeve portion, and the sliding rotating element further includes a sliding shaft body. The first positioning column and the second positioning column protrude from the sliding shaft body, where the sleeve portion is sleeved on the sliding shaft body, and the sliding shaft body has a rotational degree of freedom relative to the sleeve portion. The slide rail is parallel to the first sliding slot and the second sliding slot, and the sliding portion is slidably connected to the slide rail.

In an embodiment of the invention, the sliding shaft body rotatably contacts an annular inner surface of the sleeve portion, and the annular inner surface has a plurality of convex portions and a plurality of concave portions.

In an embodiment of the invention, the portable electronic device further includes switch element, a first rack, a gear, a second rack, and a locking element. The switch element is slidably disposed on the host. The first rack is disposed on the host, where the first rack is mechanically coupled to the switch element. The gear is pivoted on the host, where the first rack is engaged with the gear. The second rack is disposed on the host, where the second rack is perpendicular to the first rack, and the second rack is engaged with the gear. The locking element is fixed to the second rack. The first rack is configured to slide along with the switch element synchronously and drive the gear to rotate. The gear drives the second rack to slide, and the locking element slides along with the second rack synchronously to lock or to be separated from the sliding portion.

In an embodiment of the invention, the second positioning column includes a right positioning column and a left positioning column, and the right positioning column and the left positioning column are located on two sides of the first positioning column. The side guiding portion includes a right side guiding portion and a left side guiding portion, where the right side guiding portion and the left side guiding portion both have a first side arc sliding slot, a second side arc sliding slot, and a third side arc sliding slot, and each of the second side arc sliding slots and the corresponding third side arc sliding slot surround the corresponding first side arc sliding slot. The first sliding slot is connected to each of the first side arc sliding slots, and the second sliding slot is connected to each of the second side arc sliding slots and each of the third side arc sliding slots. In a mode, the first positioning column slides from the first sliding slot into the first side arc sliding slot of the right side guiding portion, the right positioning column slides from the second sliding slot into the second side arc sliding slot of the right side guiding portion, and the left positioning column slides from the second sliding slot into the third side arc sliding slot of the right side guiding portion. In another mode, the first positioning column slides from the first sliding slot into the first side arc sliding slot of the left side guiding portion, the left positioning column slides from the second sliding slot into the second side arc sliding slot of the left side guiding portion, and the right positioning column slides from the second sliding slot into the third side arc sliding slot of the left side guiding portion.

In an embodiment of the invention, the keyboard includes a keyboard main body, a right linking rod, and a left linking rod, and the right linking rod and the left linking rod both have a first end and a second end. The first end of the right linking rod is pivotally connected to a side of the keyboard main body, and the first end of the left linking rod is pivotally connected to another side of the keyboard main body. The second end of the right linking rod is disposed corresponding to the second side arc sliding slot of the right side guiding portion, and the second end of the left linking rod is disposed corresponding to the second side arc sliding slot of the left side guiding portion. In a mode, the right positioning column slides from the second sliding slot into the second side arc sliding slot of the right side guiding portion and is mechanically coupled to the second end of the right linking rod, to drive the second end of the right linking rod along the second side arc sliding slot of the right side guiding portion. In another mode, the left positioning column slides from the second sliding slot into the second side arc sliding slot of the left side guiding portion and is mechanically coupled to the second end of the left linking rod, to drive the second end of the left linking rod to slide along the second side arc sliding slot of the left side guiding portion.

Based on the foregoing, in the portable electronic device in the invention, the display not only rotates relative to the host around the first axial direction to perform unfolding and closing or to adjust the viewing angle of the screen, but also rotates around the second axial direction perpendicular to the first axial direction on the host to adjust the orientation and viewing angle of the screen or to be convenient for the user to share the image on the display with others. Besides, the display also slides along the first axial direction on the host to provide the user with different operating modes. Therefore, the portable electronic device of the invention exhibits excellent operational flexibility.

In order to make the aforementioned features and advantages of the invention more obvious and comprehensible, embodiments are specifically provided hereinafter, and are described in detail in conjunction with the accompanying drawings as follows.

DESCRIPTION OF THE EMBODIMENTS

Figure 1:
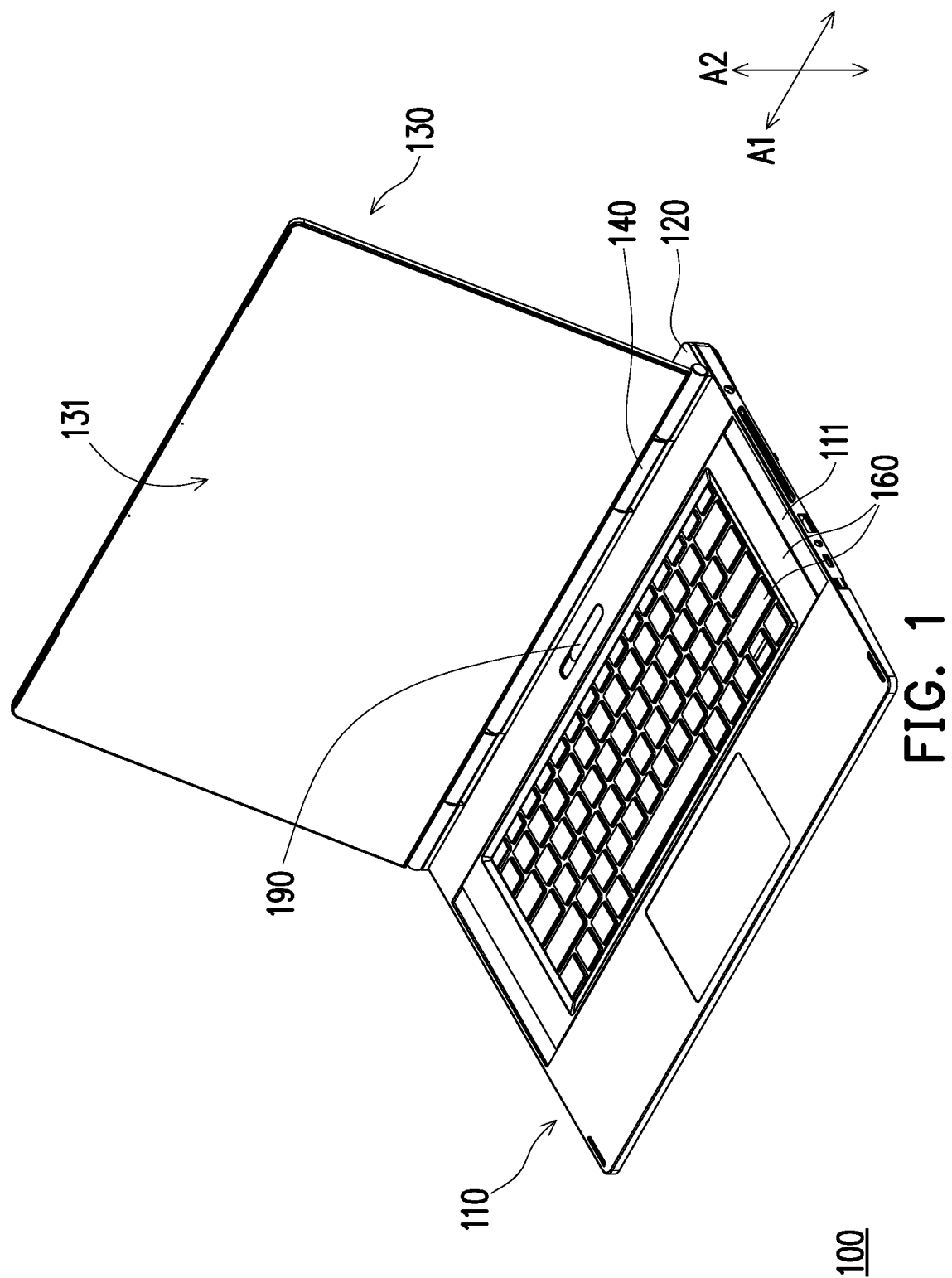
FIG. 1 is a schematic diagram of a portable electronic device in a first operating mode according to an embodiment of the invention.
Figure 2:
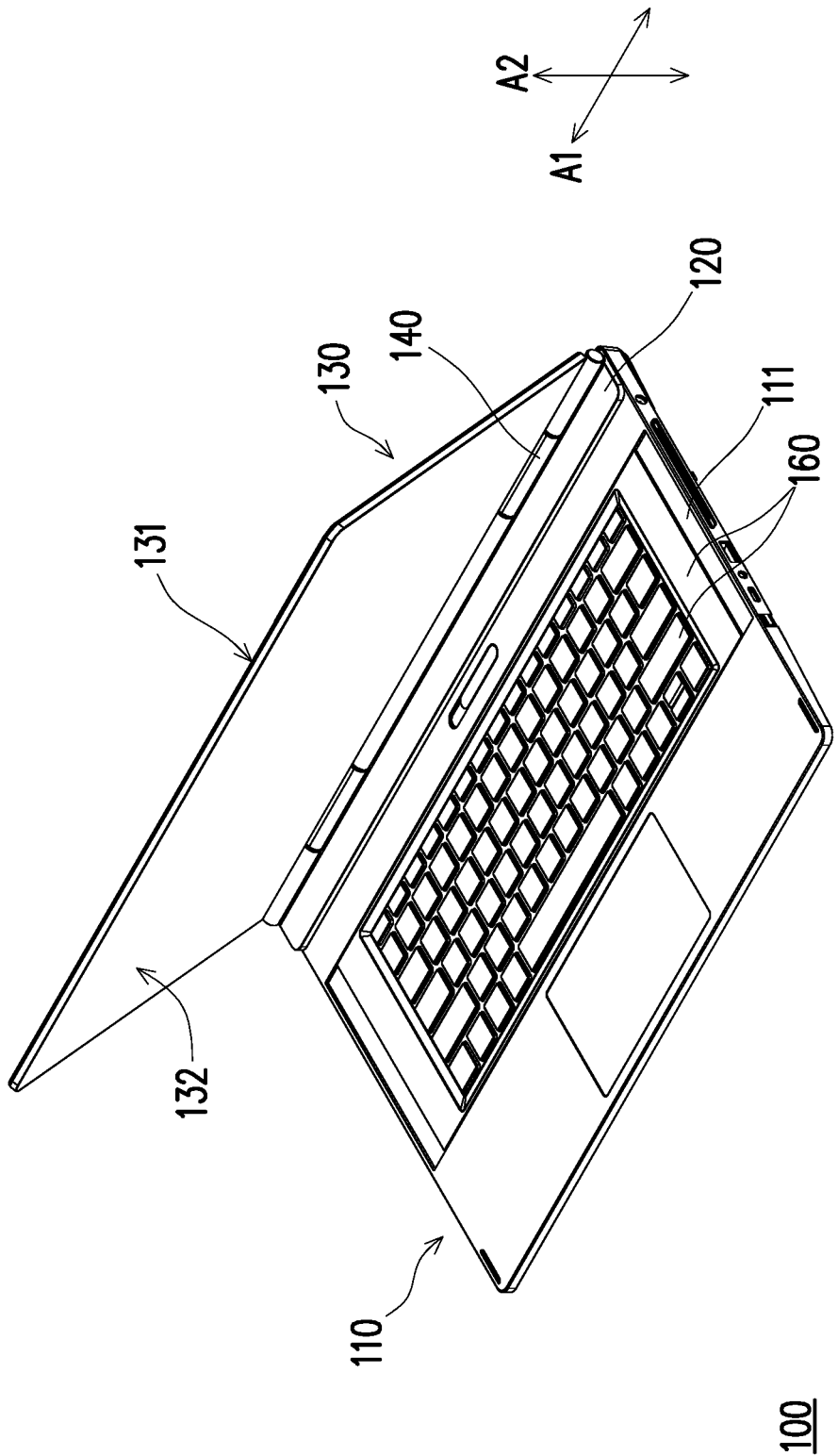
FIG. 2 is a schematic diagram of the portable electronic device in FIG. 1 being switched to a second operating mode.

FIG. is a schematic diagram of a portable electronic device in a first operating mode according to an embodiment of the invention. FIG. 2 is a schematic diagram of the portable electronic device in FIG. 1 being switched to a second operating mode. Referring to FIG. 1 and FIG. 2, in this embodiment, a portable electronic device 100 may be a notebook computer and includes a host 110, a base plate 120, and a display 130. The base plate 120 is disposed on the host 110, and the display 130 is pivoted on the base plate 120. The display 130 rotates around a first axial direction A1 relative to the base plate 120 and the host 110 to perform unfolding and closing or to adjust a viewing angle of the screen 131. On the other hand, the display 130 and the base plate 120 synchronously rotate around a second axial direction A2 perpendicular to the first axial direction A1 on the host 110 to adjust an orientation and the viewing angle of the screen 131 or to be convenient for a user to share an image on the display 131 with others.

In the operating mode shown in FIG. 1, the screen 131 of the display 130 faces the host 110. During the process of switching from the operating mode shown in FIG. 1 to the operating mode shown in FIG. 2, the display 130 and the base plate 120 synchronously rotate 180 degrees around the second axial direction A2 on the host 110. In the operating mode shown in FIG. 2, the screen 131 of the display 130 faces away from the host 110, and a back cover 132 of the display 130 faces the host 110, to be convenient for the user to share the image on the screen 131 with others.

For example, the portable electronic device 100 may switch from the operating mode shown in FIG. 1 to another operating mode. As an instance, the display 130 and the base plate 120 synchronously rotate 30 degrees, 60 degrees, 90 degrees, 120 degrees, or 150 degrees or through another angle around the second axial direction A2 on the host 110 to adjust the orientation and the viewing angle of the screen 131.

Referring to FIG. 1, the portable electronic device 100 further includes a hinge 140. The hinge 140 is located between the display 130 and the base plate 120, and the display 130 is pivotally connected to the base plate 120 through the hinge 140 to rotate relative to the base plate 120 and the host 110 around the first axial direction A1.

Figure 3:
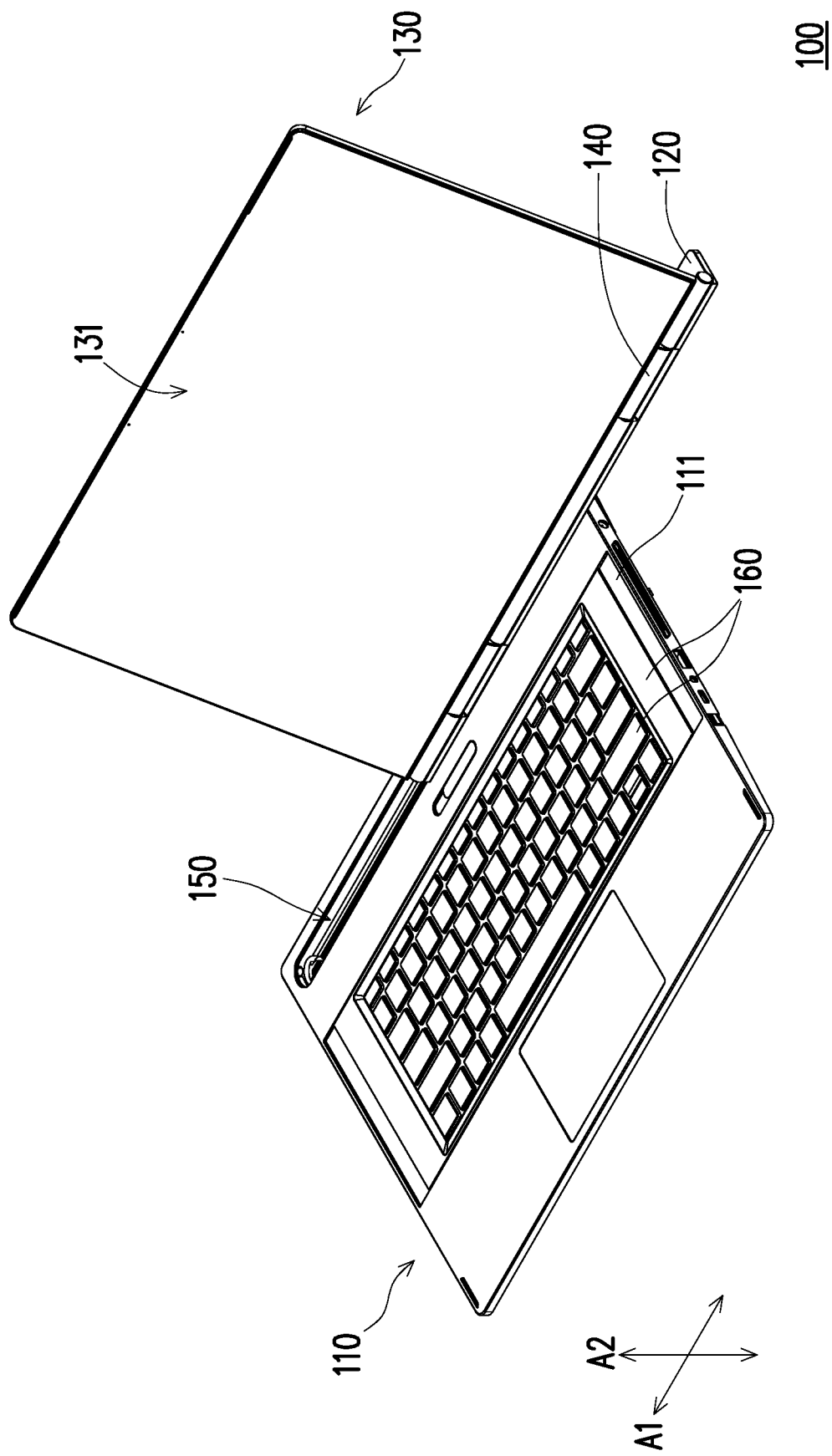
FIG. 3 is a schematic diagram of the portable electronic device in FIG. 1 being switched to a third operating mode.
Figure 4:
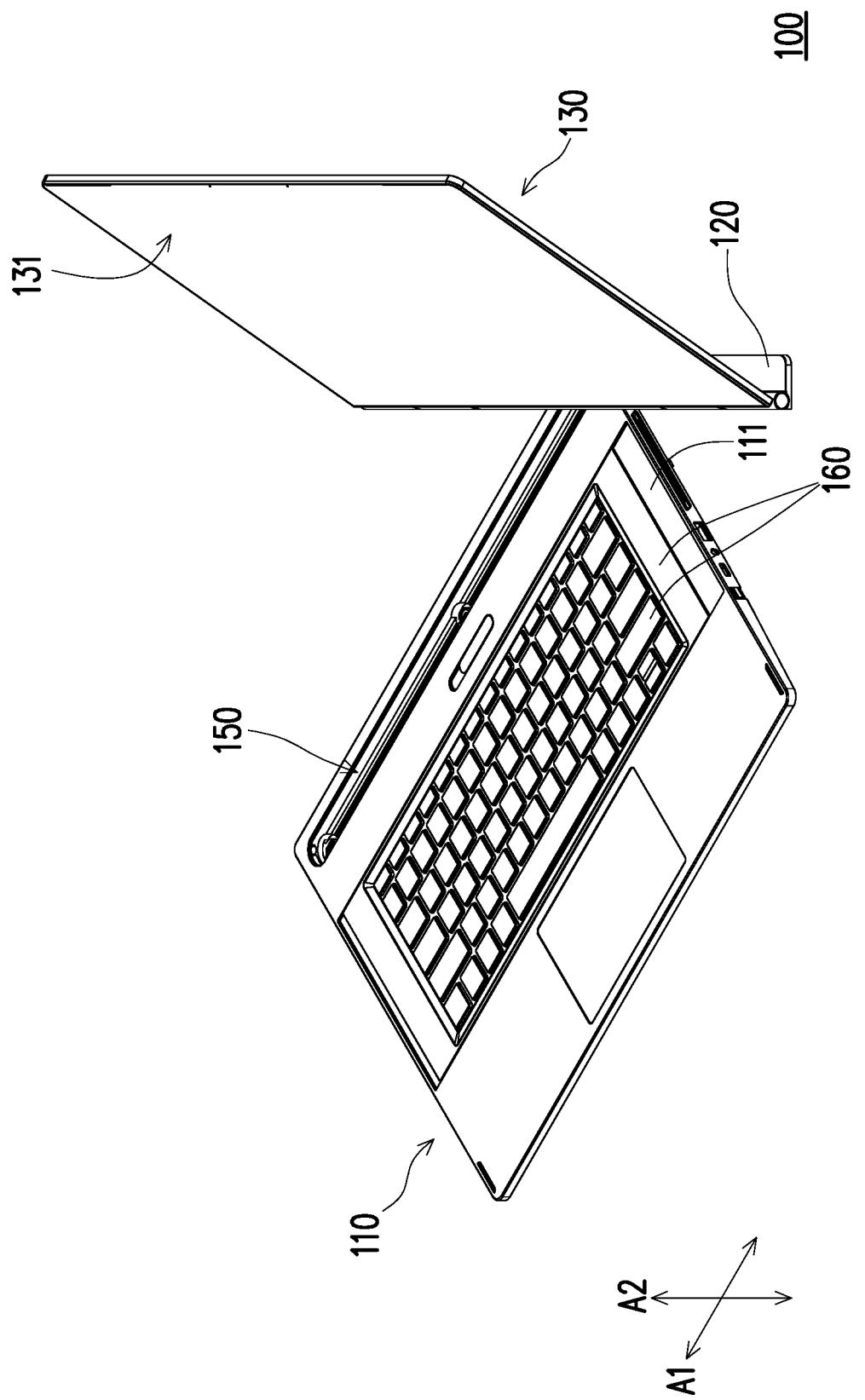
FIG. 4 is a schematic diagram of the portable electronic device of FIG. 3 being switched to a fourth operating mode.
Figure 5:
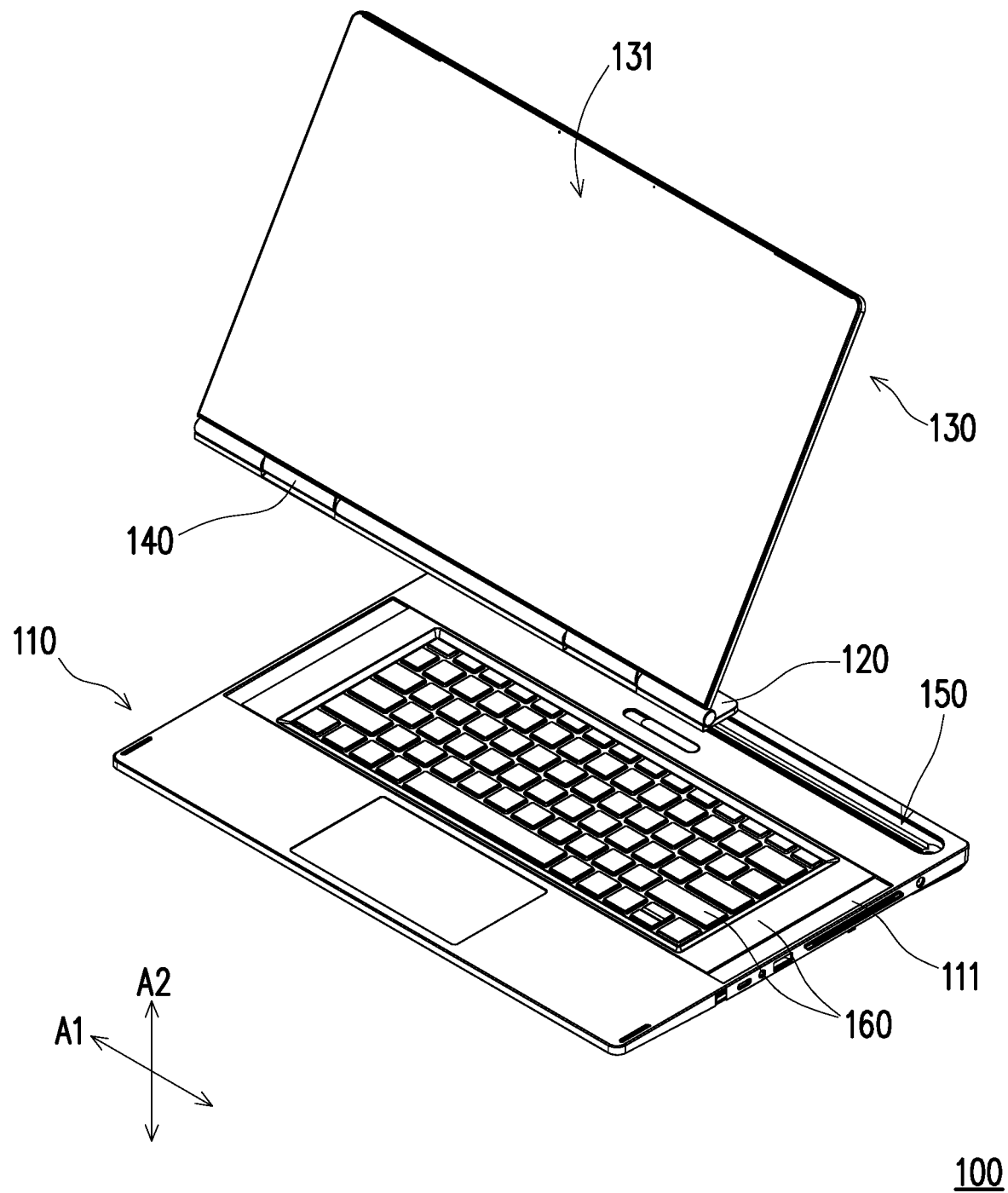
FIG. 5 is a schematic diagram of the portable electronic device of FIG. 1 being switched to a fifth operating mode.
Figure 6:
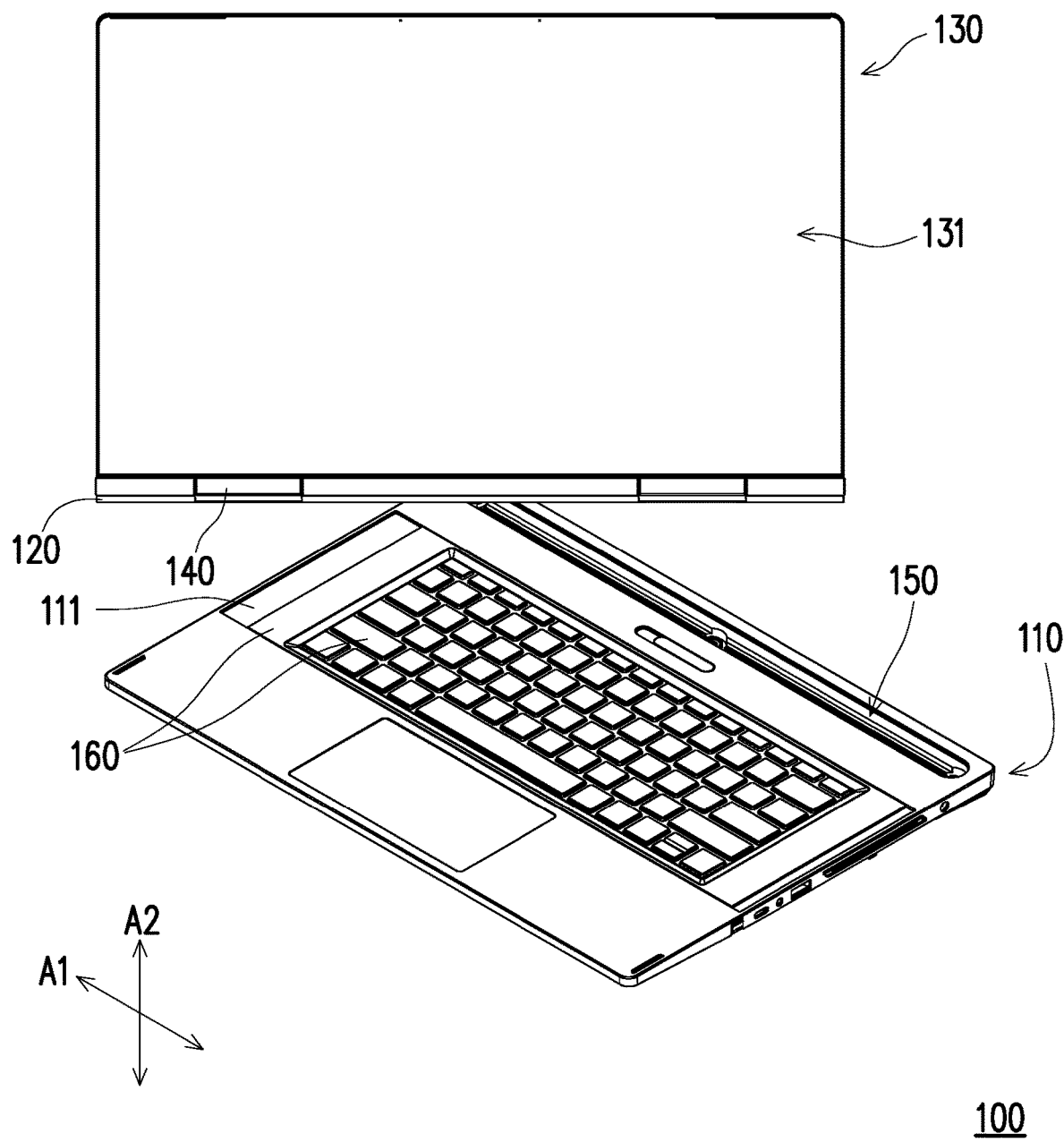
FIG. 6 is a schematic diagram of the portable electronic device of FIG. 5 being switched to a sixth operating mode.

FIG. 3 is a schematic diagram of the portable electronic device in FIG. 1 being switched to a third operating mode. FIG. 4 is a schematic diagram of the portable electronic device of FIG. 3 being switched to a fourth operating mode. FIG. 5 is a schematic diagram of the portable electronic device of FIG. 1 being switched to a fifth operating mode. FIG. 6 is a schematic diagram of the portable electronic device of FIG. 5 being switched to a sixth operating mode. Referring to FIG. 1 and FIG. 3, the display 130 and the base plate 120 synchronously slide to the right along the first axial direction A1 on the host 110 to provide the user with a different operating mode. Referring to FIG. 1 and FIG. 5, the display 130 and the base plate 120 synchronously slide to the left along the first axial direction A1 on the host 110 to provide the user with a different operating mode. Referring to FIG. 3 and FIG. 5, the portable electronic device 100 further includes a sliding base 150 fixed on the host 110 to limit a sliding direction and a slide stroke of the display 130 and the base plate 120.

Referring to FIG. 1, FIG. 3 and FIG. 4, when the display 130 and the base plate 120 slide to a right dead center of the slide stroke or slide to abut an end on a right side of the sliding base 150, the display 130 and the base plate 120 synchronously rotate around the second axial direction A2 on the host 110 to adjust the orientation and viewing angle of screen 131. In this embodiment, the portable electronic device 100 further includes a keyboard 160 slidably disposed on the host 110. When the display 130 and the base plate 120 are at the right dead center of the slide stroke and synchronously rotate around the second axial direction A2, the display 130 and the base plate 120 drives the keyboard 160 to slide to the left along the first axial direction A1 on the host 110, so that it is convenient for the user to operate the keyboard 160.

As shown in FIG. 4, after the display 130 is moved to the right and rotated, the user may connect an external desktop display behind the keyboard 160, so that it is convenient for the user to watch the display 130 and the desktop display at the same time while keeping the line of sight in the middle. In addition, when the user watches the display 130 and the desktop display at the same time, the keyboard 160 that is moved to the left is convenient for the user to operate.

Referring to FIG. 1, FIG. 5 and FIG. 6, when the display 130 and the base plate 120 slide to a left dead center of the slide stroke or slide to abut an end on a left side of the sliding base 150, the display 130 and the base plate 120 synchronously rotate around the second axial direction A2 on the host 110 to adjust the orientation and viewing angle of screen 131. When the display 130 and the base plate 120 are at the left dead center of the slide stroke and synchronously rotate around the second axial direction A2, the display 130 and the base plate 120 drives the keyboard 160 to slide to the right along the first axial direction A1 on the host 110, so that it is convenient for the user to operate the keyboard 160.

As shown in FIG. 6, after the display 130 is moved to the left and rotated, the user may connect an external desktop display behind the keyboard 160, so that it is convenient for the user to watch the display 130 and the desktop display at the same time while keeping the line of sight in the middle. In addition, when the user watches the display 130 and the desktop display at the same time, the keyboard 160 that is moved to the right is convenient for the user to operate.

Referring to FIG. 3 to FIG. 6, the host 110 has a groove 111 configured to accommodate the keyboard 160, and the portable electronic device 100 therefore meets the design requirement for being thinned and light-weighted. On the other hand, the keyboard 160 is slidably disposed in the groove 111, so the groove 111 may be configured to define a sliding direction of the keyboard 160.

Figure 7:
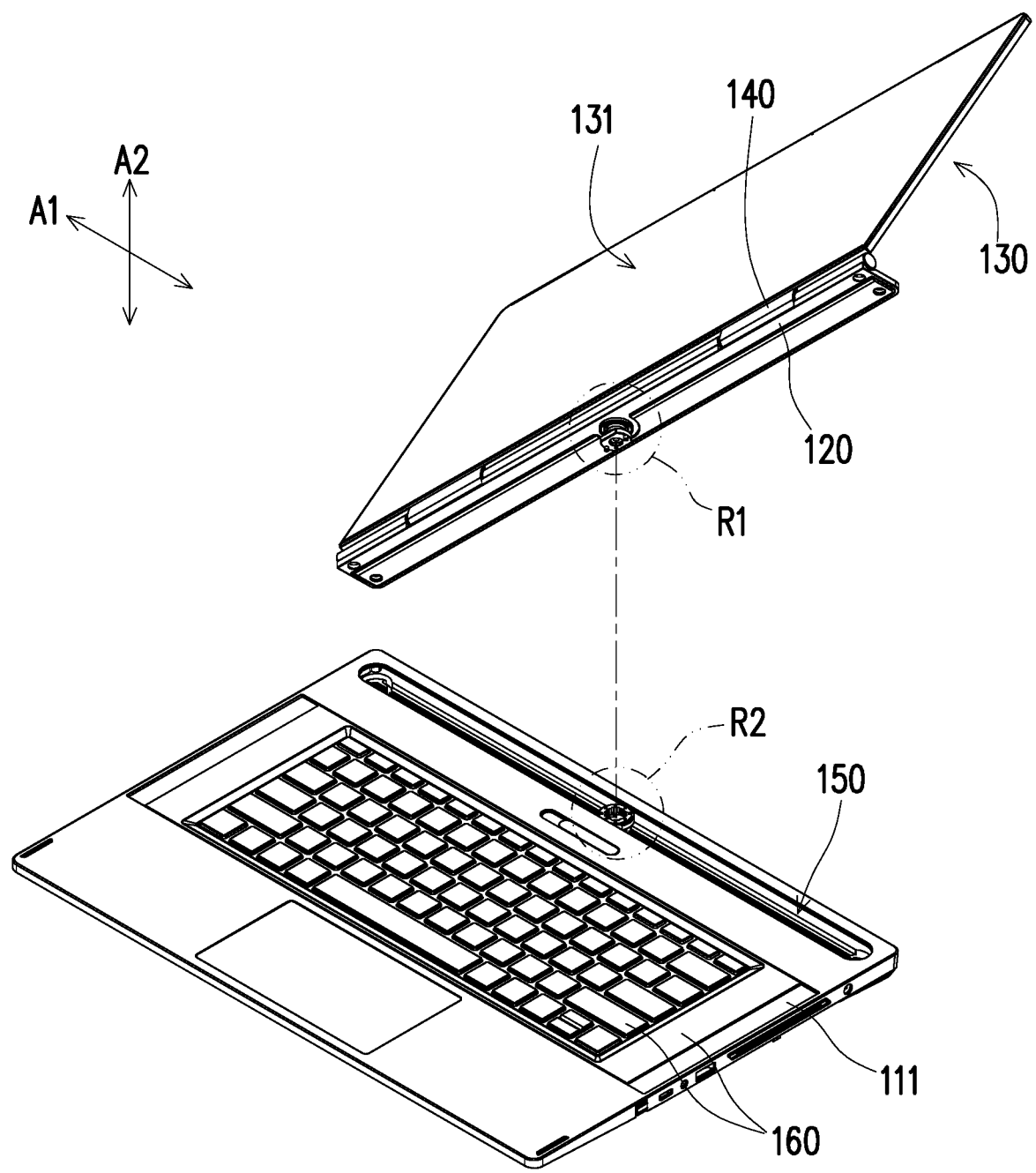
FIG. 7 is a schematic partial disassembly diagram of the portable electronic device of FIG. 1.
Figure 9:
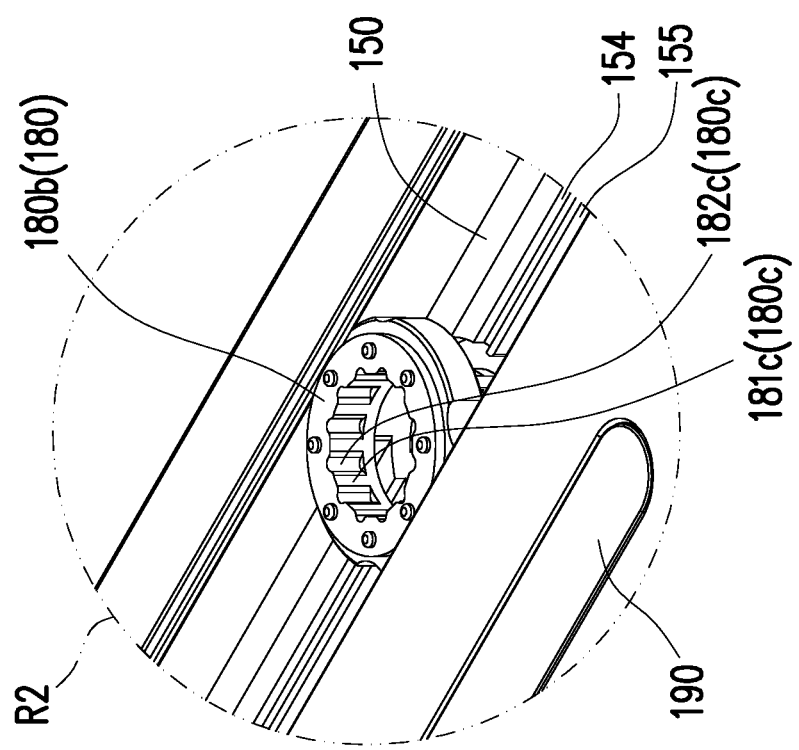
FIG. 9 is a schematic enlarged diagram of zone R2 in FIG. 7.
Figure 8:
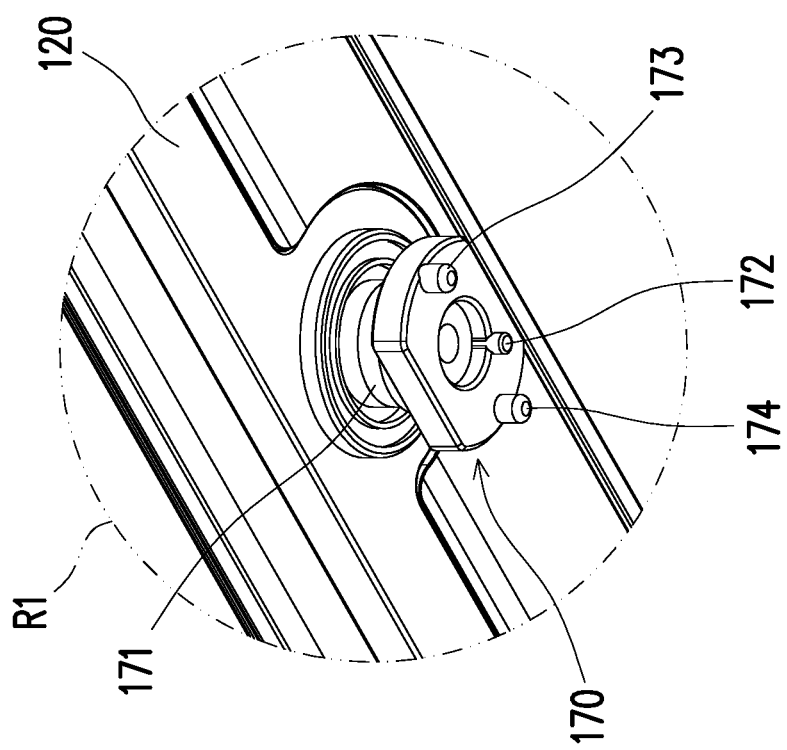
FIG. 8 is a schematic enlarged diagram of zone R1 in FIG. 7.

FIG. 7 is a schematic partial disassembly diagram of the portable electronic device of FIG. 1. FIG. 8 is a schematic enlarged diagram of zone R1 in FIG. 7. FIG. 9 is a schematic enlarged diagram of zone R2 in FIG. 7. Referring to FIG. 1, FIG. 7, FIG. 8, and FIG. 9, in this embodiment, the portable electronic device 100 further includes a sliding rotating element 170 fixed on the base plate 120 and a sliding piece 180 slidably disposed on the host 110, and the sliding rotating element 170 is disposed through the sliding piece 180. The sliding rotating element 170 is rotatably and slidably connected to the sliding base 150, so the display 130 and the base plate 120 rotate around the second axial direction A2 or slide along the first axial direction A1 on the sliding base 150 along with the sliding rotating element 170.

In addition, the sliding piece 180 slides along with the sliding rotating element 170 synchronously.

Since the sliding base 150 is fixed on the host 110, rotation of the display 130, the base plate 120, and the sliding rotating element 170 on the sliding base 150 may be regarded as rotation of the display 130, the base plate 120, and the sliding rotating element 170 on the host 110. In addition, sliding of the display 130, the base plate 120, and the sliding rotating element 170 on the sliding base 150 may be regarded as sliding of the display 130, the base plate 120, and the sliding rotating element 170 on the host 110.

Figure 10:
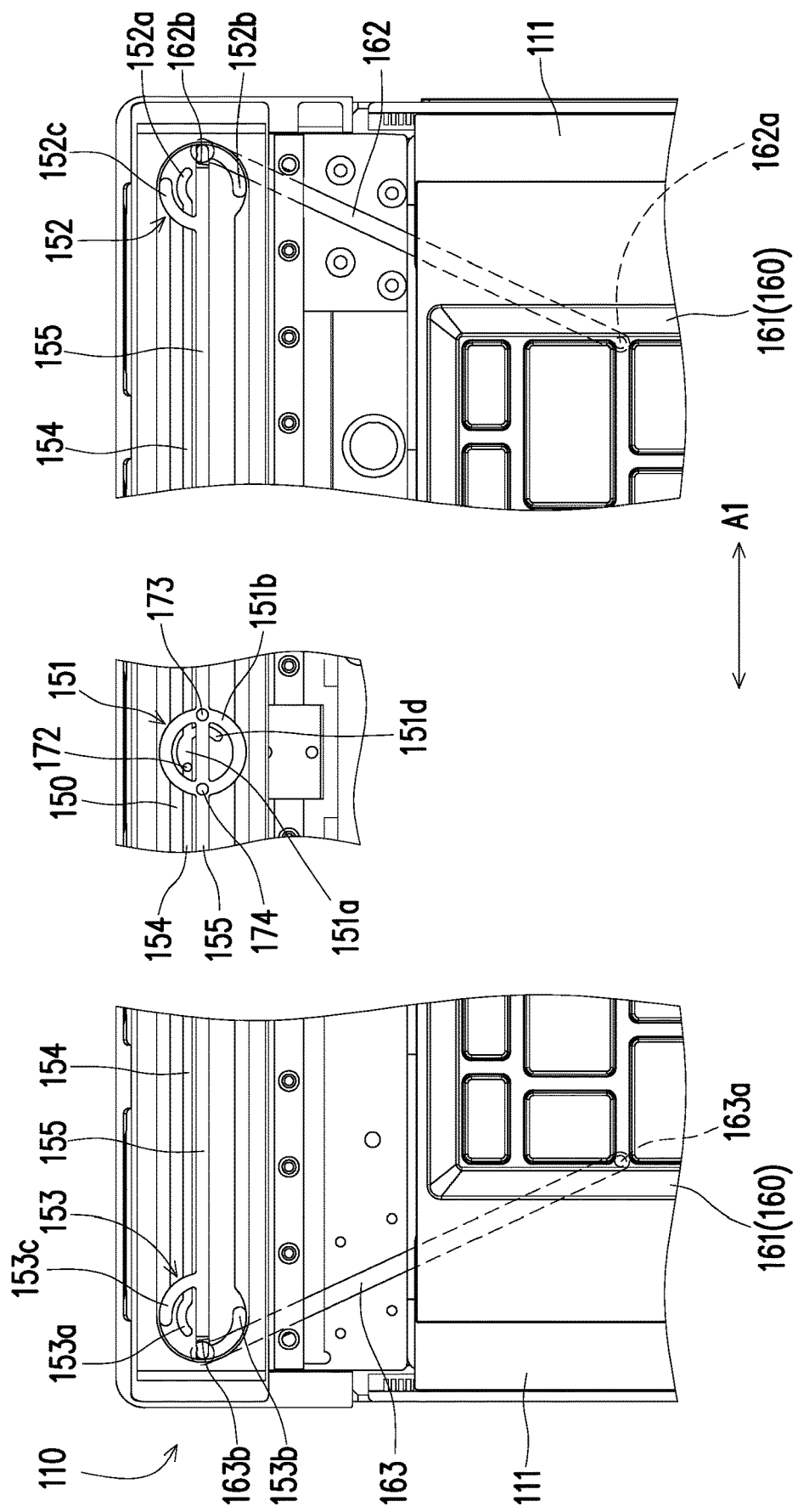
FIG. 10 is a schematic partially enlarged top view of an internal structure of the portable electronic device of FIG. 1.

FIG. 10 is a schematic partially enlarged top view of an internal structure of the portable electronic device of FIG. 1. Referring to FIG. 7, FIG. 8, and FIG. 10, in this embodiment, the sliding rotating element 170 includes a sliding shaft body 171 and at least one positioning column protruding from the bottom of the sliding shaft body 171. Herein the positioning column includes a first positioning column 172 and a second positioning column, and the second positioning column includes a right positioning column 173 and a left positioning column 174. The right positioning column 173 and the left positioning column 174 are located on two sides of the first positioning column 172. For example, a connecting line between the first positioning column 172 and the right positioning column 173, a connecting line between the first positioning column 172 and the left positioning column 174, and a connecting line between the right positioning column 173 and the left positioning column 174 form a triangular outline.

The sliding base 150 has at least one guiding portion and at least one sliding slot connecting the guiding portion. Herein the guiding portion includes a middle guiding portion 151 and a side guiding portion relative to the middle guiding portion 151, and the sliding slot includes a first sliding slot 154 parallel to the first axial direction A1 and a second sliding slot 155 parallel to the first sliding slot 154. The side guiding portion includes a right side guiding portion 152 and a left side guiding portion 153, and the middle guiding portion 151 is located between the right side guiding portion 152 and the left side guiding portion 153. On the other hand, the first sliding slot 154 extends from the middle guiding portion 151 to the right side guiding portion 152 and the left side guiding portion 153, so the first sliding slot 154 is connected to the right side guiding portion 152, the middle guiding portion 151, and the left side guiding portion 153. The second sliding slot 155 extends from the middle guiding portion 151 to the right side guiding portion 152 and the left side guiding portion 153, so the second sliding slot 155 is connected to the right side guiding portion 152, the middle guiding portion 151, and the left side guiding portion 153.

As shown in FIG. 1, FIG. 2, FIG. 8, and FIG. 10, the first positioning column 172, the right positioning column 173, and the left positioning column 174 may slide in the middle guiding portion 151 so that the display 130 and the base plate 120 rotate along with the sliding rotating element 170 around the second axial direction A2 on the sliding base 150. In this embodiment, the middle guiding portion 151 has a first middle arc sliding slot 151a and a second middle arc sliding slot 151b surrounding the first middle arc sliding slot 151a, and the first middle arc sliding slot 151a and the second middle arc sliding slot 151b are concentric. For example, a radian of the first middle arc sliding slot 151a is $\pi$, and a radian of the second middle arc sliding slot 151b is $2\pi$.

The first sliding slot 154 penetrates the first middle arc sliding slot 151a, and the second sliding slot 155 penetrates the second middle arc sliding slot 151b. When the first positioning column 172, the right positioning column 173, and the left positioning column 174 are positioned at the middle guiding portion 151, the first positioning column 172 is configured to slide in the first middle arc sliding slot 151a, and the right positioning column 173 and the left positioning column 174 are configured to slide in the second middle arc sliding slot 151b. Based on the geometric design of the first middle arc sliding slot 151a, the rotation range of the display 130, the base plate 120, and the sliding rotating element 170 in the middle guiding portion 151 of the sliding base 150 is 180 degrees.

Figure 11:
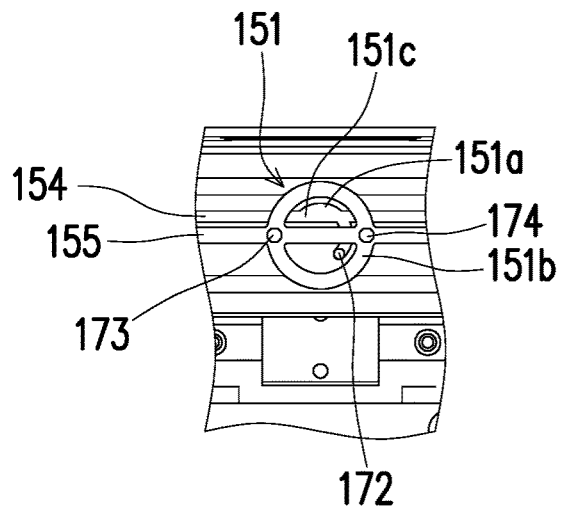
FIG. 11 is a schematic partially enlarged top view of the internal structure of the portable electronic device of FIG. 2.

FIG. 11 is a schematic partially enlarged top view of the internal structure of the portable electronic device of FIG. 2. Referring to FIG. 1, FIG. 2, FIG. 10, and FIG. 11, in this embodiment, the first middle arc sliding slot 151a has a sliding end 151c and a restricting end 151d relative to the sliding end 151c. Herein the first sliding slot 154 penetrates the sliding end 151c, and the first positioning column 172 slides between the sliding end 151c and the restricting end 151d.

When the first positioning column 172 is positioned at the sliding end 151c, the first positioning column 172 is adapted to slide into the first sliding slot 154 from the first middle arc sliding slot 151a, and the right positioning column 173 and the left positioning column 174 are adapted to slide into the second sliding slot 155 from the second middle arc sliding slot 151b. In other words, only in the operating mode shown in FIG. 1 can the display 130, the base plate 120, and the sliding rotating element 170 slide along the first axial direction A1 on the host 110.

When the first positioning column 172 slides to the restricting end 151d, the first positioning column 172 deviates from the first sliding slot 154 and cannot slide into the first sliding slot 154. Restricted by the structural interference between the first positioning column 172 and the restricting end 151d, the right positioning column 173 and the left positioning column 174 are prevented from sliding into the second sliding slot 155. That is to say, in the operating mode shown in FIG. 2, the display 130, the base plate 120, and the sliding rotating element 170 cannot slide along the first axial direction A1 on the host 110.

Figure 12:
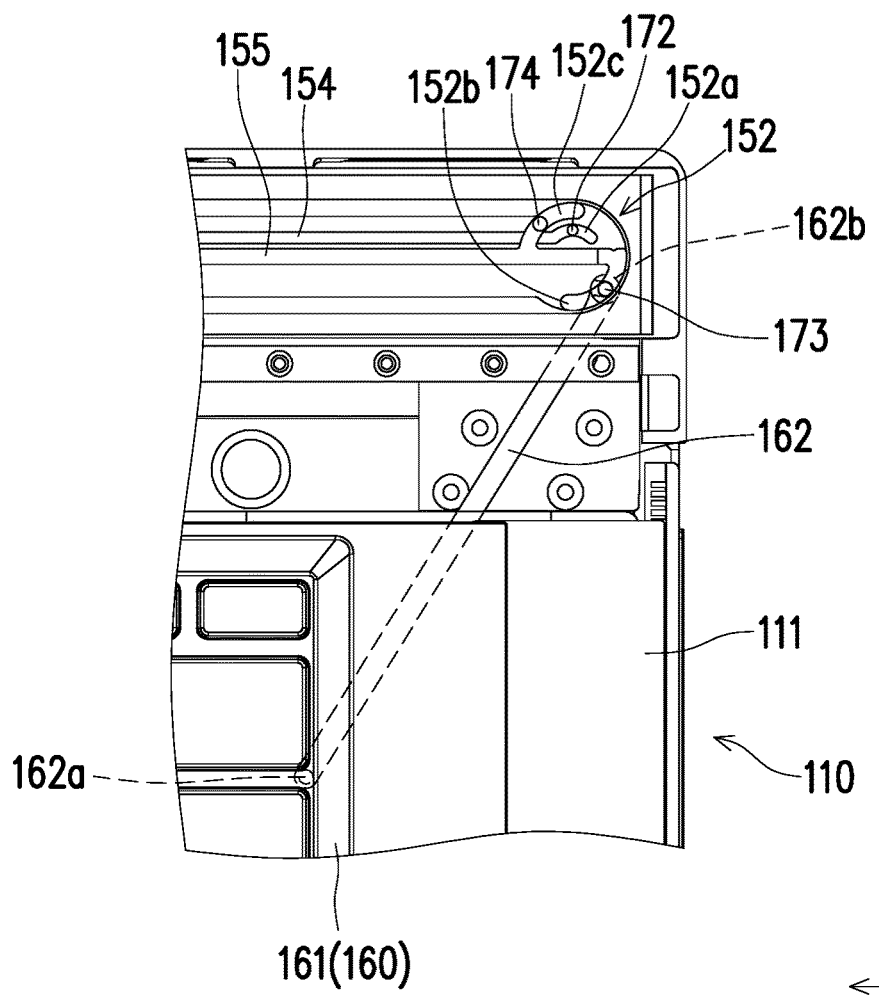
FIG. 12 is a schematic partially enlarged top view of the internal structure of the portable electronic device of FIG. 4.

Referring to FIG. 10 and FIG. 12, in this embodiment, the right side guiding portion 152 has a first side arc sliding slot 152a, a second side arc sliding slot 152b, and a third side arc sliding slot 152c. Herein the second side arc sliding slot 152b and the third side arc sliding slot 152c surround the first side arc sliding slot 152a, and the first side arc sliding slot 152a, the second side arc sliding slot 152b, and third side arc sliding slot 152c are concentric. For example, radians of the first side arc sliding slot 152a, the second side arc sliding slot 152b, and the third side arc sliding slot 152c are all $\pi/2$.

Moreover, the first sliding slot 154 is connected to the first side arc sliding slot 152a, and the second sliding slot 155 is connected to the second side arc sliding slot 152b and the third side arc sliding slot 152c. Furthermore, the first sliding slot 154 extending to the right side guiding portion 152 is first connected to the third side arc sliding slot 152c, and then connected to the second side arc sliding slot 152b.

As shown in FIG. 1, FIG. 4, FIG. 8, FIG. 10, and FIG. 12, after the sliding rotating element 170 slide from the middle guiding portion 151 to the right side guiding portion 152 on the basis of cooperation between the first positioning column 172 and the first sliding slot 154, cooperation between the right positioning column 173 and the second sliding slot 155, and cooperation between the left positioning column 174 and the second sliding slot 155, the first positioning column 172 may slide from the first sliding slot 154 into the first side arc sliding slot 152a, the right positioning column 173 may slide from the second sliding slot 155 into the second side arc sliding slot 152b, and the left positioning column 174 may slide from the second sliding slot 155 slide into the third side arc sliding slot 152c. At this time, the display 130 and the base plate 120 rotate along with the sliding rotating element 170 around the second axial direction A2 on the sliding base 150, and through the sliding rotating element 170, the display 130 and the base plate 120 drive the keyboard 160 to slide along the first axial direction A1 to the left on the host 110.

Based on the geometric design of the second side arc sliding slot 152b and the third side arc sliding slot 152c, the rotation range of the display 130, the base plate 120, and the sliding rotating element 170 in the right side guiding portion 152 of the sliding base 150 is 90 degrees.

Referring to FIG. 10 and FIG. 12, in this embodiment, the keyboard 160 includes a keyboard main body 161, a right linking rod 162, and a left linking rod 163. Herein the right linking rod 162 has a first end 162a and a second end 162b, and the left linking rod 163 has a first end 163a and a second end 163b. The first end 162a of the right linking rod 162 is pivotally connected to a right side of the keyboard main body 161, and the first end 163a of the left linking rod 163 is pivotally connected to a left side of the keyboard main body 161. Furthermore, the second end 162b of the right linking rod 162 is disposed corresponding to the second side arc sliding slot 152b of the right side guiding portion 152. When the right positioning column 173 slides from the second sliding slot 155 into the second side arc sliding slot 152b of the right side guiding portion 152 and is mechanically coupled to the second end 162b of the right linking rod 162, the right positioning column 173 drives the second end 162b of the right linking rod 162 to slide along the second side arc sliding slot 152b of the right side guiding portion 152, and the first end 162a of the right linking rod 162 propels the keyboard main body 161.

Figure 13:
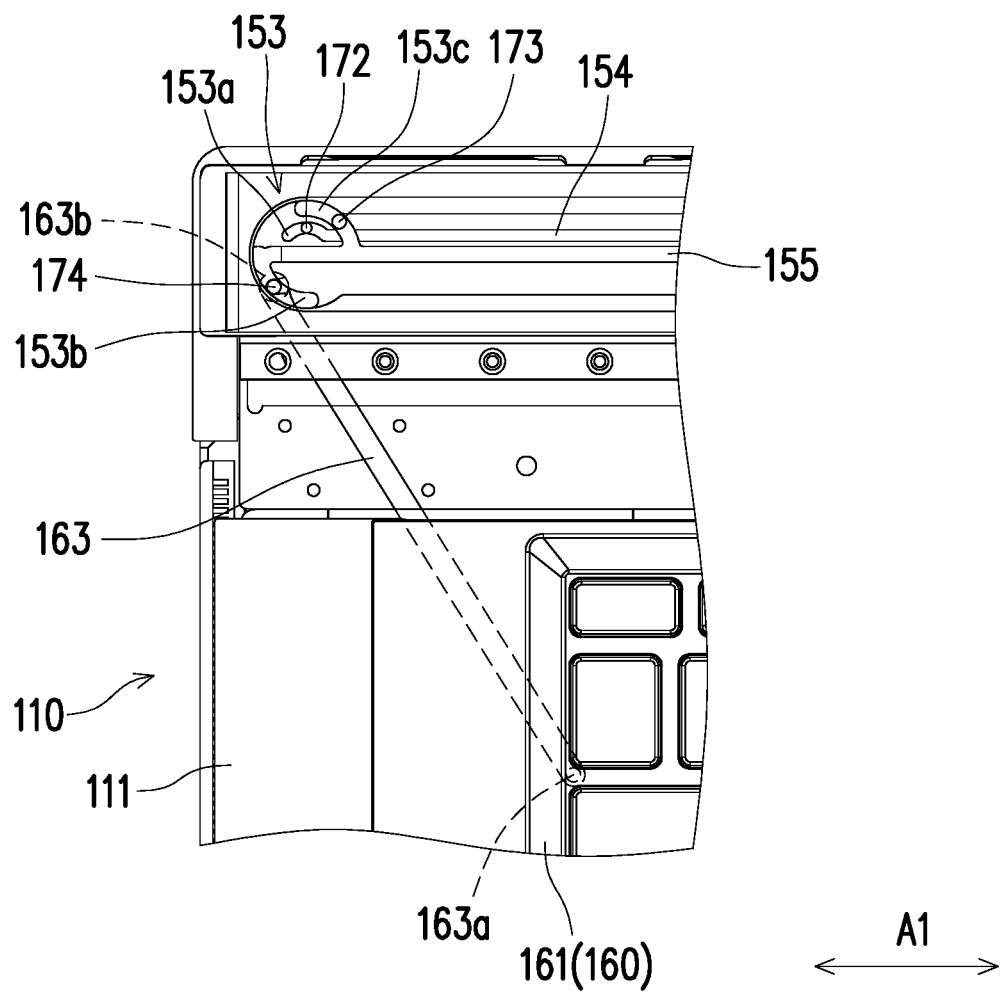
FIG. 13 is a schematic partially enlarged top view of the internal structure of the portable electronic device of FIG. 6.

Referring to FIG. 10 and FIG. 13, in this embodiment, the right side guiding portion 152 and the left side guiding portion 153 are symmetrically disposed on two sides of the middle guiding portion 151. In addition, the left side guiding portion 153 has a first side arc sliding slot 153a, a second side arc sliding slot 153b, and a third side arc sliding slot 153c. Herein the second side arc sliding slot 153b and the third side arc sliding slot 153c surround the first side arc sliding slot 153a, and the first side arc sliding slot 153a, the second side arc sliding slot 153b, and the third side arc sliding slot 153c are concentric. For example, radians of the first side arc sliding slot 153a, the second side arc sliding slot 153b, and the third side arc sliding slot 153c are all π/2.

Moreover, the first sliding slot 154 is connected to the first side arc sliding slot 153a, and the second sliding slot 155 is connected to the second side arc sliding slot 153b and the third side arc sliding slot 153c. Furthermore, the first sliding slot 154 extending to the left side guiding portion 153 is first connected to the third side arc sliding slot 153c, and then connected to the second side arc sliding slot 153b.

As shown in FIG. 1, FIG. 6, FIG. 8, FIG. 10, and FIG. 13, after the sliding rotating element 170 slide from the middle guiding portion 151 to the left side guiding portion 153 on the basis of cooperation between the first positioning column 172 and the first sliding slot 154, cooperation between the right positioning column 173 and the second sliding slot 155, and cooperation between the left positioning column 174 and the second sliding slot 155, the first positioning column 172 may slide from the first sliding slot 154 into the first side arc sliding slot 153a, the left positioning column 174 may slide from the second sliding slot 155 into the second side arc sliding slot 153b, and the right positioning column 173 may slide from the second sliding slot 155 into the third side arc sliding slot 153c. At this time, the display 130 and the base plate 120 rotate along with the sliding rotating element 170 around the second axial direction A2 on the sliding base 150, and through the sliding rotating element 170, the display 130 and the base plate 120 drive the keyboard 160 to slide along the first axial direction A1 to the right on the host 110.

Based on the geometric design of the second side arc sliding slot 153b and the third side arc sliding slot 153c, the rotation range of the display 130, the base plate 120, and the sliding rotating element 170 in the left side guiding portion 153 of the sliding base 150 is 90 degrees.

Referring to FIG. 10 and FIG. 13, in this embodiment, the second end 163b of the left linking rod 163 is disposed corresponding to the second side arc sliding slot 153b of the left side guiding portion 153. When the left positioning column 174 slides from the second sliding slot 155 into the second side arc sliding slot 153b of the left side guiding portion 153 and is mechanically coupled to the second end 163b of the left linking rod 163, the left positioning column 174 drives the second end 163b of the left linking rod 163 to slide along the second side arc sliding slot 153b of the left side guiding portion 153, and the first end 163a of the left linking rod 163 propels the keyboard main body 161.

Figure 14:
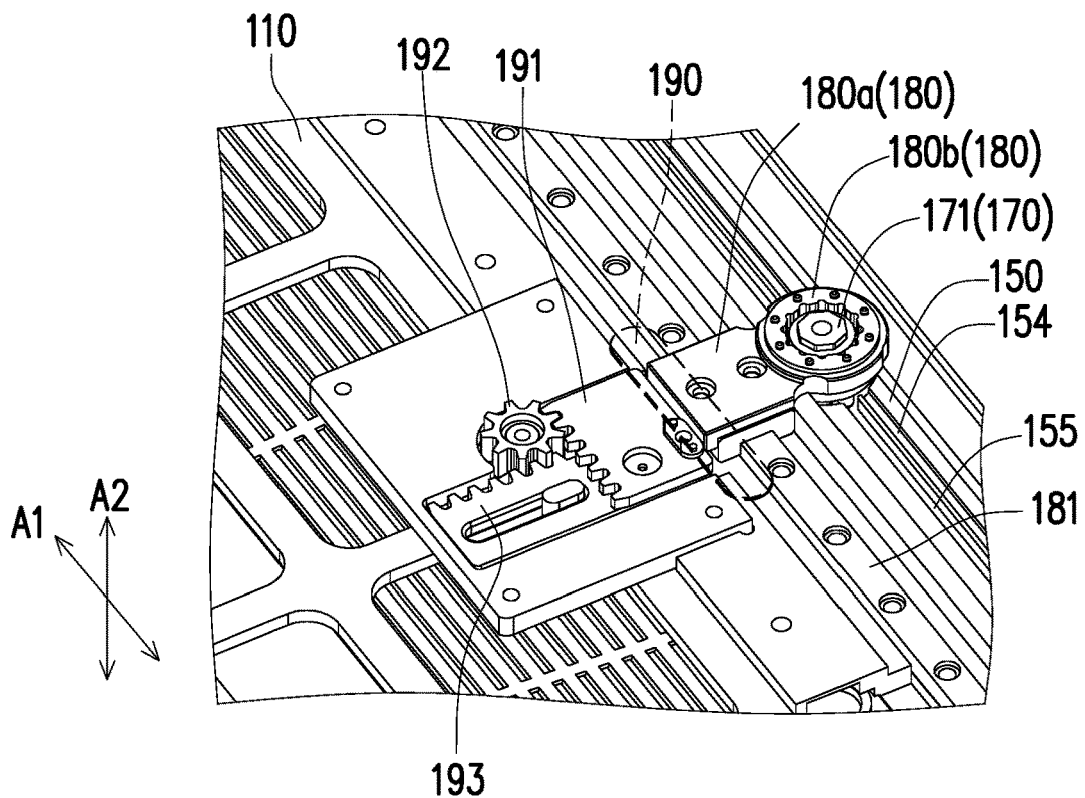
FIG. 14 is a schematic partially enlarged diagram of the internal structure of the portable electronic device in FIG. 1 corresponding to a location of a switch element.
Figure 15:
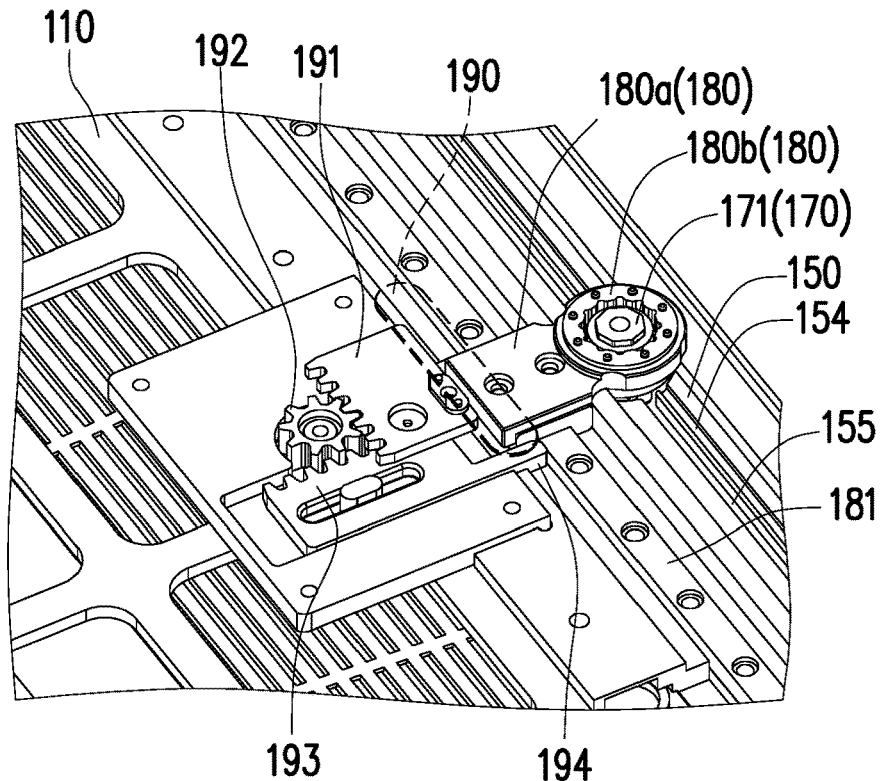
FIG. 15 is a schematic partially enlarged diagram of an internal structure of the switch element of FIG. 14 after being switched.

FIG. 14 is a schematic partially enlarged diagram of the internal structure of the portable electronic device in FIG. 1 corresponding to a location of a switch element. FIG. 15 is a schematic partially enlarged diagram of an internal structure of the switch element of FIG. 14 after being switched. To clearly presenting relative positions between adjacent components, a switch element 190 in FIG. 14 and FIG. 15 is illustrated with a dash double dotted line. Referring to FIG. 8, FIG. 9, and FIG. 14, in this embodiment, the portable electronic device 100 further includes a slide rail 181. Herein the sliding piece 180 has a sliding portion 180a and a sleeve portion 180b, and the sleeve portion 180b is sleeved on the sliding shaft body 171 of the sliding rotating element 170. In addition, the sliding shaft body 171 has a rotational degree of freedom relative to the sleeve portion 180b around the second axial direction A2. On the other hand, the slide rail 181 is parallel to the first sliding slot 154 and the second sliding slot 155, and the sliding portion 180a is slidably connected to the slide rail 181. Therefore, the sliding rotating element 170 and the sliding portion 180a synchronously slide along the first axial direction A1 on the sliding base 150.

The sliding shaft body 171 of the sliding rotating element 170 rotatably contacts an annular inner surface 180c of the sleeve portion 180b, and the annular inner surface 180c has concavities and convexities to generate frictional resistance with the sliding shaft body 171. Specifically, the annular inner surface 180c has a plurality of convex portions 181c and a plurality of concave portions 182c, configured to generate the frictional resistance with the sliding shaft body 171. Therefore, after the sliding shaft body 171 rotates relative to the sleeve portion 180b around the second axial direction A2, the frictional resistance between the sleeve portion 180b and the sliding shaft body 171 may be configured to maintain a rotation angle of the sliding shaft body 171 and prevent the sliding shaft body 171 from loosening. Furthermore, the plurality of convex portions 181c and the plurality of concave portions 182c on the annular inner surface 180c generate the frictional resistance with the sliding shaft body 171, so that the sliding shaft body 171 is easily positioned at a plurality of specific predetermined angles.

Referring to FIG. 1, FIG. 14, and FIG. 15, in this embodiment, the portable electronic device 100 further includes a switch element 190, a first rack 191, a gear 192, a second rack 193, and a locking element 194. The switch element 190 is slidably disposed on the host 110 to be convenient for the user to operate. The first rack 191 is disposed on the host 110. The first rack 191 is mechanically coupled to the switch element 190 to slide along with the switch element 190 synchronously. The gear 192 is pivoted on the host 110. The gear 192 is engaged with the first rack 191 to be driven by the first rack 191 to rotate. The second rack 193 is disposed on the host 110, and the second rack 193 is perpendicular to the first rack 191. The second rack 193 is engaged with the gear 192 to be driven by the gear 192 to slide.

On the other hand, the locking element 194 is fixed to the second rack 193. The locking element 194 slides along with the second rack 193 synchronously and is disposed corresponding to the sliding portion 180*a* of the sliding piece 180. As shown in FIG. 14, the locking element 194 is separated from the sliding portion 180*a* of the sliding piece 180, and the sliding rotating element 170 and the sliding piece 180 can slide on the sliding base 150. As shown in FIG. 15, the locking element 194 locks or clamps the sliding portion 180*a* of the sliding piece 180, so that the sliding piece 180 cannot slide on the sliding base 150 temporarily. Correspondingly, the sliding rotating element 170 connected to the sliding piece 180 also cannot slide on the sliding base 150 temporarily. In other words, the user can control a rotational degree of freedom of the sliding rotating element 170 and the sliding piece 180 on the sliding base 150 by propelling the switch element 190.

In summary of the foregoing, in the portable electronic device in the invention, the display not only rotates relative to the host around the first axial direction to perform unfolding and closing or to adjust the viewing angle of the screen, but also rotates around the second axial direction perpendicular to the first axial direction on the host to adjust the orientation and viewing angle of the screen or to be convenient for the user to share the image on the display with others. Besides, the display also slides along the first axial direction on the host to provide the user with different operating modes. Therefore, the portable electronic device of the invention exhibits excellent operational flexibility.

Furthermore, the sliding base is fixed on the host, and the display and the base plate slide along the first axial direction on the sliding base through the sliding rotating element. When the sliding rotating element slides to the right side guiding portion of the sliding base, the sliding rotating element may rotate around the second axial direction on the sliding base, and the display rotates along with the sliding rotating element synchronously to adjust the orientation of the screen. At the same time, the sliding rotating element that is rotating drives the keyboard to slide along the first axial direction to the left on the host, so that it is convenient for the user to operate the keyboard. In contrast, when the sliding rotating element slides to the left side guiding portion of the sliding base, the sliding rotating element may rotate around the second axial direction on the sliding base, and the display rotates along with the sliding rotating element synchronously to adjust the orientation of the screen. At the same time, the sliding rotating element that is rotating drives the keyboard to slide along the first axial direction to the right on the host, so that it is convenient for the user to operate the keyboard.

Although the invention has been disclosed as above with the embodiments, they are not employed to limit the invention. Anyone having common knowledge in the art can make some modifications and embellishments without departing from the scope or spirit of the invention. Therefore, the scope of the invention should be subject to what is defined in the claims annexed hereafter.

What is claimed is:

1. A portable electronic device, comprising:
   a host;
   a sliding base, disposed on the host, wherein the sliding base has at least one guiding portion and at least one sliding slot connected to the at least one guiding portion;
   a base plate, disposed on the sliding base;
   a display, pivoted on the base plate; and
   a sliding rotating element, fixed on the base plate, wherein the sliding rotating element is rotatably and slidably connected to the sliding base, and the display and the base plate are configured to rotate or slide along with the sliding rotating element on the sliding base, wherein the sliding rotating element comprises at least one positioning column, wherein
   in a mode, the at least one positioning column is positioned at the at least one guiding portion, and the display and the base plate are configured to rotate along with the sliding rotating element on the sliding base, and
   in another mode, the at least one positioning column slides from the at least one guiding portion into the at least one sliding slot, and the display and the base plate are configured to slide along with the sliding rotating element on the sliding base.

2. The portable electronic device as described in claim 1, further comprising:
   a hinge, located between the display and the base plate, wherein the display is pivotally connected to the base plate through the hinge.

3. The portable electronic device as described in claim 1, wherein the at least one guiding portion comprises a middle guiding portion and a side guiding portion relative to the middle guiding portion, the at least one sliding slot comprises a first sliding slot and a second sliding slot parallel to the first sliding slot, and the first sliding slot and the second sliding slot are connected to the middle guiding portion and the side guiding portion.

4. The portable electronic device as described in claim 3, wherein the at least one positioning column comprises a first positioning column and a second positioning column, wherein in a mode, the first positioning column and the second positioning column are positioned at the middle guiding portion or the side guiding portion, and in another mode, the first positioning column and the second positioning column slide from the middle guiding portion or the side guiding portion into the first sliding slot and the second sliding slot.

5. The portable electronic device as described in claim 4, further comprising:
   a keyboard, slidably disposed on the host, wherein when the first positioning column and the second positioning column are positioned at the side guiding portion, and the sliding rotating element is rotating on the sliding base, the second positioning column propels the keyboard to slide on the host.

6. The portable electronic device as described in claim 5, wherein the host has a groove, and the keyboard is slidably disposed in the groove.

7. The portable electronic device as described in claim 5, wherein the side guiding portion has a first side arc sliding slot and a second side arc sliding slot, the first sliding slot is connected to the first side arc sliding slot, and the second sliding slot is connected to the second side arc sliding slot, wherein the first positioning column is configured to slide from the first sliding slot into the first side arc sliding slot, and the second positioning column is configured to slide from the second sliding slot into the second side arc sliding slot.

8. The portable electronic device as described in claim 7, wherein the keyboard comprises a keyboard main body and a connecting rod, and the connecting rod has a first end and a second end, wherein the first end is pivotally connected to the keyboard main body, the second end is disposed corresponding to the second side arc sliding slot, and the second positioning column is configured to slide from the second sliding slot into the second side arc sliding slot to be mechanically coupled to the second end, to drive the second end to slide along the second side arc sliding slot.

9. The portable electronic device as described in claim 4, wherein the middle guiding portion has a first middle arc sliding slot and a second middle arc sliding slot, the first sliding slot penetrates the first middle arc sliding slot, and the second sliding slot penetrates the second middle arc sliding slot, wherein when the first positioning column and the second positioning column are positioned at the middle guiding portion, the first positioning column is configured to slide in the first middle arc sliding slot, and the second positioning column is configured to slide in the second middle arc sliding slot.

10. The portable electronic device as described in claim 9, wherein the first middle arc sliding slot has a sliding end and a restricting end relative to the sliding end, the first sliding slot penetrates the sliding end, and the first positioning column slides between the sliding end and the restricting end.

11. The portable electronic device as described in claim 10, wherein when the first positioning column is positioned at the sliding end, the first positioning column is adapted to slide from the first middle arc sliding slot into the first sliding slot, and the second positioning column is adapted to slide from the second middle arc sliding slot into the second sliding slot, and when the first positioning column slides to the restricting end, the first positioning column deviates from the first sliding slot and is incapable of sliding into the first sliding slot, and the second positioning column is prevented from sliding into the second sliding slot.

12. The portable electronic device as described in claim 10, wherein the second middle arc sliding slot surrounds the first middle arc sliding slot.

13. The portable electronic device as described in claim 4, further comprising:

a sliding piece, wherein the sliding piece has a sliding portion and a sleeve portion, the sliding rotating element further comprises a sliding shaft body, and the first positioning column and the second positioning column protrude from the sliding shaft body, wherein the sleeve portion is sleeved on the sliding shaft body, and the sliding shaft body has a rotational degree of freedom relative to the sleeve portion; and a slide rail, wherein the slide rail is parallel to the first sliding slot and the second sliding slot, and the sliding portion is slidably connected to the slide rail.

14. The portable electronic device as described in claim 13, wherein the sliding shaft body rotatably contacts an annular inner surface of the sleeve portion, and the annular inner surface has a plurality of convex portions and a plurality of concave portions.

15. The portable electronic device as described in claim 13, further comprising:

a switch element, slidably disposed on the host;
a first rack, disposed on the host, wherein the first rack is mechanically coupled to the switch element;
a gear, pivoted on the host, wherein the first rack is engaged with the gear;
a second rack, disposed on the host, wherein the second rack is perpendicular to the first rack, and the second rack is engaged with the gear; and
a locking element, fixed to the second rack, wherein
the first rack is configured to slide along with the switch element synchronously and drive the gear to rotate, the gear drives the second rack to slide, and the locking element slides along with the second rack synchronously to lock or to be separated from the sliding portion.

16. The portable electronic device as described in claim 5, wherein the second positioning column comprises a right positioning column and a left positioning column, the right positioning column and the left positioning column are located on two sides of the first positioning column, and the side guiding portion comprises a right side guiding portion and a left side guiding portion, wherein the right side guiding portion and the left side guiding portion both have a first side arc sliding slot, a second side arc sliding slot, and a third side arc sliding slot, and each of the second side arc sliding slots and the corresponding third side arc sliding slot surround the corresponding first side arc sliding slot, wherein the first sliding slot is connected to each of the first side arc sliding slots, and the second sliding slot is connected to each of the second side arc sliding slots and each of the third side arc sliding slots.

17. The portable electronic device as described in claim 16, wherein in a mode, the first positioning column slides from the first sliding slot into the first side arc sliding slot of the right side guiding portion, the right positioning column slides from the second sliding slot into the second side arc sliding slot of the right side guiding portion, and the left positioning column slides from the second sliding slot into the third side arc sliding slot of the right side guiding portion, and in another mode, the first positioning column slides from the first sliding slot into the first side arc sliding slot of the left side guiding portion, the left positioning column slides from the second sliding slot into the second side arc sliding slot of the left side guiding portion, and the right positioning column slides from the second sliding slot into the third side arc sliding slot of the left side guiding portion.

18. The portable electronic device as described in claim 16, wherein the keyboard comprises a keyboard main body, a right linking rod, and a left linking rod, and the right linking rod and the left linking rod both have a first end and a second end, wherein the first end of the right linking rod is pivotally connected to one side of the keyboard main body, the first end of the left linking rod is pivotally connected to an other side of the keyboard main body, the second end of the right linking rod is disposed corresponding to the second side arc sliding slot of the right side guiding portion, and the second end of the left linking rod is disposed corresponding to the second side arc sliding slot of the left side guiding portion.

19. The portable electronic device as described in claim 18, wherein in a mode, the right positioning column slides from the second sliding slot into the second side arc sliding slot of the right side guiding portion and is mechanically coupled to the second end of the right linking rod, to drive the second end of the right linking rod to slide along the second side arc sliding slot of the right side guiding portion, and in another mode, the left positioning column slides from the second sliding slot into the second side arc sliding slot of the left side guiding portion and is mechanically coupled to the second end of the left linking rod, to drive the second end of the left linking rod to slide along the second side arc sliding slot of the left side guiding portion.

* * * * *